(No Model.)
F. W. HEDGELAND.
MITER CLAMP.
No. 477,254. Patented June 21, 1892.
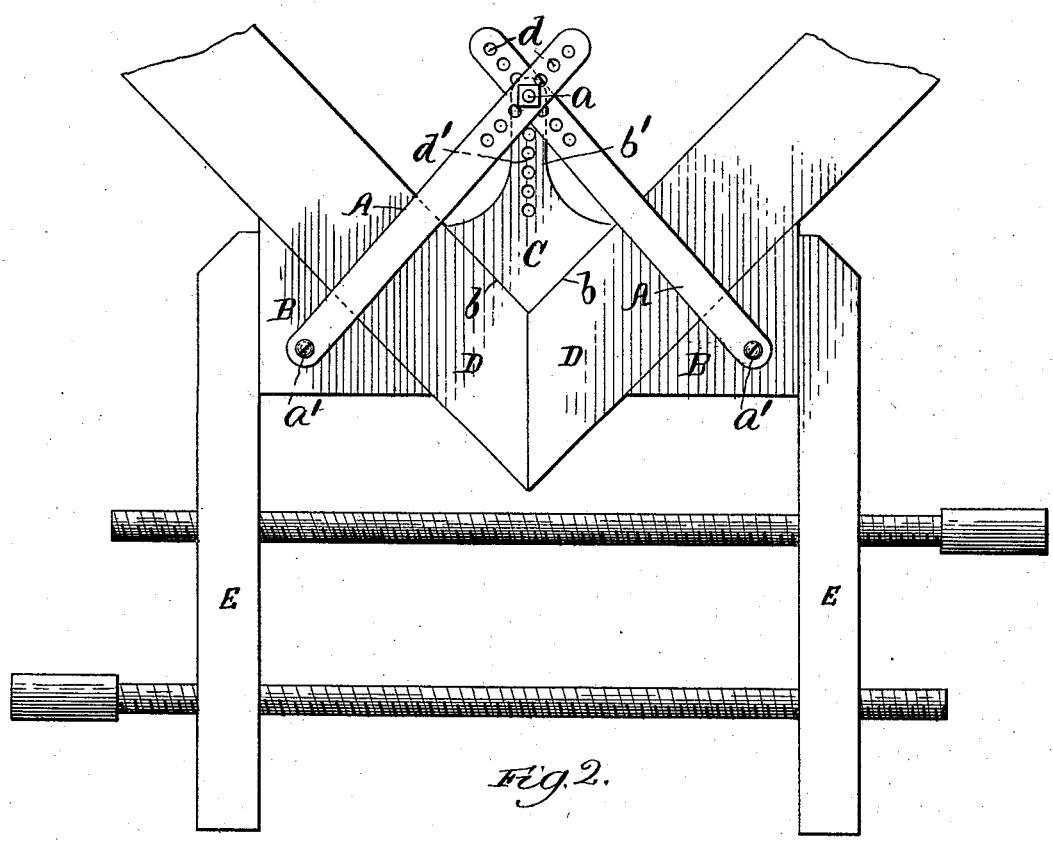
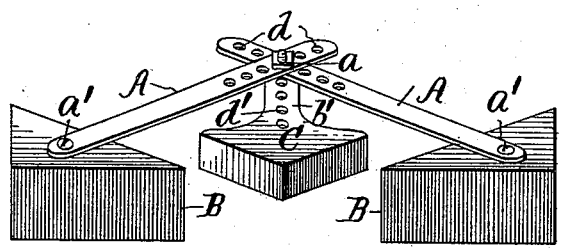
Witnesses:
Chas. E. Gaylord.
Clifford W. White.
Inventor:
F. W. Hedgeland.
By L. B. Coupland & Co
Attys

UNITED STATES PATENT OFFICE.

FREDERICK W. HEDGELAND, OF CHICAGO, ILLINOIS.

MITER-CLAMP.

SPECIFICATION forming part of Letters Patent No. 477,254, dated June 21, 1892.

Application filed November 27, 1891. Serial No. 413,281. (No model.)

*To all whom it may concern:*

Be it known that I, FREDERICK W. HEDGELAND, a citizen of the United States, residing at Chicago, in the county of Cook and State of Illinois, have invented certain new and useful Improvements in Miter-Clamps, of which the following is a full, clear, and exact description, that will enable others to make and use the same, reference being had to the accompanying drawings, in which—

Figure 1 is a plan showing a practical application of the device, and Fig. 2 a view in perspective of the device proper.

This invention relates to improvements in miter-clamps, and has for its object to provide a simple and efficient device of this character whereby the uniting faces of a miter are uniformly and evenly drawn together to form a close joint, and locked in that position until permanently fastened.

This clamping device will be found especially useful in the manufacture of picture-frames; but is also adapted to be used in uniting the meeting ends of various kinds of moldings, either when uniting at a right angle or any other angle, and matching together on a line bisecting the angle of junction.

The device consists of the companion levers A A, the clamping-blocks B B, and the internal corner block or wedge C. The inner ends of the levers are connected together by the pivot-bolt a. The triangular clamping-blocks are loosely connected to the outer ends of the levers by the pivots a' a'. The clamping-blocks represent two equal parts of a square figure divided cornerwise and pivoted to the respective levers, so that when in use the longest side of the triangle is brought in contact with the outer edges of the joining pieces of molding D D, (shown in Fig. 1,) and when a pressure is applied they draw toward the corner of the miter.

The wedge-block C is of a triangular form, the edges b b bearing against the inner sides of the molding-pieces, corresponding to the angle of junction. This wedge-block is provided with the stem extension b', through which is inserted the pivot-bolt a, forming a common jointed connection with the joining ends of the levers. The levers are each provided with a number of perforations d, and the stem of the wedge-block with corresponding perforations d'. This provides for the adjustment of these parts with relation to each other and in accordance with the width of the molding, a clamp of the ordinary or medium size being capable of an adjustment embracing molding from one-half up to four inches in width.

When the different parts are properly adjusted or set with reference to each other and a pressure is brought to bear on the sides of the clamping-blocks, the plane of which is parallel to that of the line of junction, the meeting ends of the molding are brought evenly together, making a very close joint. The wedge-block is drawn into the corner to a uniform bearing by the action of the other parts, so that there is no possibility of an overprojecting edge at any point along the miter-joint. The ordinary hand-screw clamp E (shown in Fig. 1) is preferably used in applying the required pressure.

The joining ends of the miter are permanently secured together in the usual manner—that is, by nails, brads, or some adhesive composition.

Having thus described my invention, what I claim, and desire to secure by Letters Patent, is—

1. In a clamping device, the combination of the companion levers pivoted together at their inner ends, the clamping-blocks pivoted to the outer ends of said levers, and a wedge-block adapted to fit the inside corner of a miter-joint, substantially as set forth.

2. In a clamping device, the combination of the companion levers pivoted together at their inner ends, the triangular blocks pivoted to the outer ends of said levers and adapted to bear against the outer edges of a miter-joint, and the wedge-block or inside corner-piece having a pivotal connection common with the connected ends of said levers, substantially as set forth.

3. In a clamping device, the combination of the companion levers provided with a number of perforations in their joining ends, the clamping-blocks adjustably connected to the opposite ends of said levers, and the wedge-block provided with a perforated stem extension and joined to the connecting ends of the clamping-levers by the same pivot-bolt, substantially as set forth.

FREDERICK W. HEDGELAND.

Witnesses:
L. M. FREEMAN,
J. B. DONALSON.